INVENTOR.
FRANK N. SURBER
BY
Woodard, Weikart, Emhardt & Naughton
Attorneys

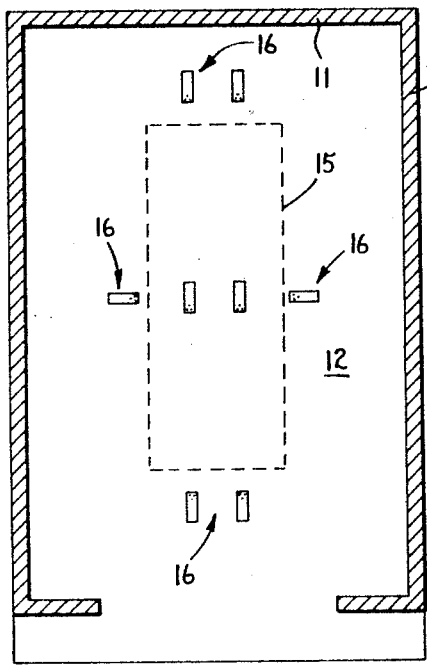
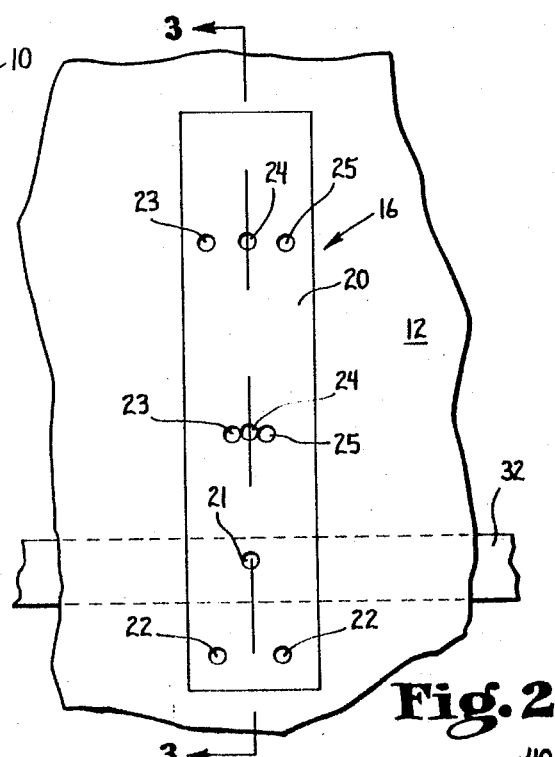
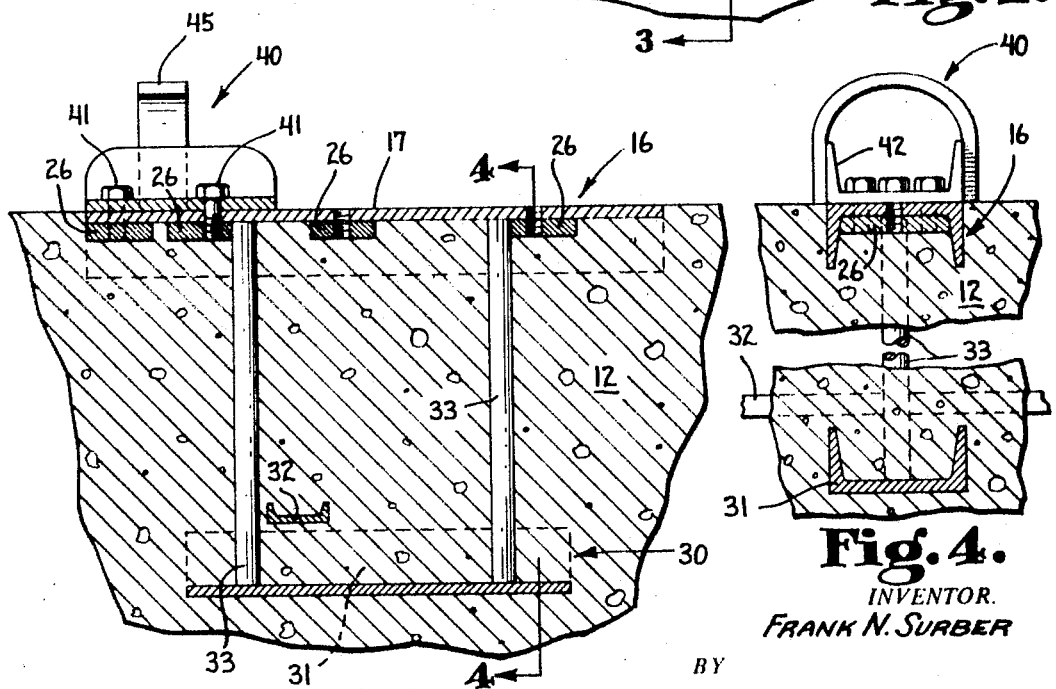
Fig. 1.
Fig. 2.
Fig. 3.
Fig. 4.
INVENTOR.
FRANK N. SURBER July 29, 1969  F. N. SURBER  3,457,767
BODY SHOP APPARATUS Filed April 29, 1966  2 Sheets-Sheet 2

United States Patent Office 3,457,767
Patented July 29, 1969

3,457,767
BODY SHOP APPARATUS
Frank N. Surber, R.R. 4, Scottsburg, Ind. 47170
Filed Apr. 29, 1966, Ser. No. 546,454
Int. Cl. B21j *13/00*; E04b *1/38, 3/06*
U.S. Cl. 72—446
2 Claims

ABSTRACT OF THE DISCLOSURE

Body shop apparatus which includes mounting elements embedded in concrete and flush with the surface of the concrete. The mounting elements have threaded apertures therein for mounting force transmitting elements at various angles.

---

The present invention relates to body shop apparatus and more particularly to apparatus for applying force to damaged automobiles and the like for repair thereof.

Body shops normally are outfitted with various types of apparatus for applying force to the frame and body of an automobile for restoring the automobile to undamaged condition. In the situation where substantial damage has been done, for example, to the frame of the automobile, it is present practice to use relatively large bulky and unwieldy equipment for returning the frame to its original shape. The bulky and unwieldy nature of this equipment is particularly irritating, inconvenient and even expensive when it is desired to use the space occupied by the equipment for other types of body work or automobile repair. Consequently, it is one object of this invention to provide body shop apparatus which is relatively small in size and easily handled yet which can be used for heavy body shop work such as, for example, the exertion of force on the frame of an automobile simultaneously at opposite ends thereof.

Still another object of this invention is to provide improved body shop apparatus.

A further object of the present invention is to provide body shop apparatus which can be adjusted to provide forces on an automobile or the like at many different angles and in many different directions.

Related objects and advantages will become apparent as the description proceeds.

One embodiment of the present invention might include body shop apparatus comprising a concrete floor, a plurality of mounting elements sunk in said concrete floor with the upper surface of said mounting elements flush with the upper surface of said concrete floor, a plurality of force-transmitting elements each removably fixed to a respective one of said mounting elements and adapted to engage a vehicle for exerting force on the vehicle.

The full nature of the invention will be understood from the accompanying drawings and the following description and claims.

FIG. 1 is a top plan view of a body shop incorporating the apparatus of the present invention.

FIG. 2 is an enlarged fragmentary plan view of a portion of the structure illustrated in FIG. 1.

FIG. 3 is a vertical section taken along the line 3—3 of FIG. 2 in the direction of the arrows.

FIG. 4 is a fragmentary vertical section taken along the line 4—4 of FIG. 3 in the direction of the arrows.

Figure 5:
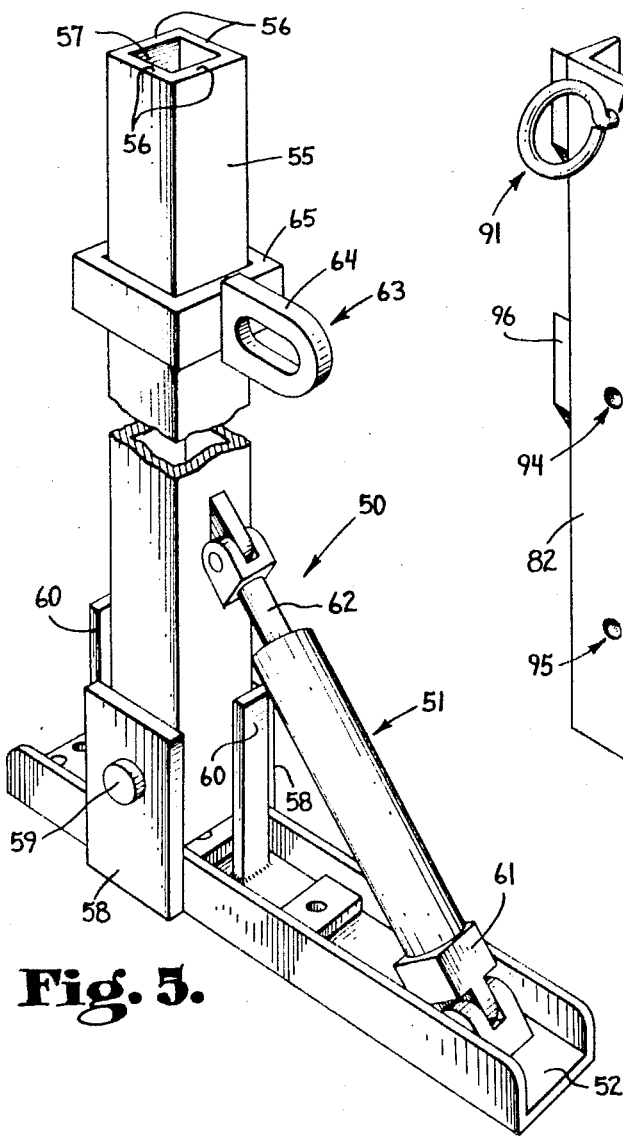
FIG. 5 is a perspective view of a force-transmitting element forming a portion of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a body shop 10 having walls 11 and a concrete floor 12. For the sake of simplicity of illustration, the body shop 10 has been shown as relatively small in size. However, it should be understood that the body shop of the present invention can have any size. When an automobile is being worked upon in the body shop of FIG. 1, it may occupy the position shown in dotted lines at 15 which gives an idea of the relative size of the apparatus illustrated in FIG. 1. Sunk in the concrete floor 12 are mounting elements 16. These mounting elements are placed in a regular pattern which might take the form illustrated in FIG. 1.

It will be noted that the concrete floor 12 is poured so as to surround the mounting elements 16 and in such a manner that the upper surface 17 of the mounting elements is flush with the upper surface of the concrete floor 12. For this reason, when the mounting elements 16 have no further apparatus secured thereto, as illustrated in FIGS. 1 and 2, the mounting elements merely form a part of the floor 12 and vehicles can be moved over the mounting elements without the mounting elements interfering in any way with the movement of the vehicles.

The details of a representative one of the mounting elements are illustrated in FIGS. 2, 3 and 4. The mounting element 16 includes a top rectangular channel 20 which defines or which provides the upper surface 17 of the mounting element. The channel 20 has nine threaded apertures 21, 22, 23, 24 and 25 formed therein. These threaded apertures are reinforced by backup members 26 which are fixed to the lower surface of the upper channel 20. The purpose of the threaded apertures 21–25 is to provide means for mounting various force-transmitting members to the mounting elements 16 at various positions and at various angles and directions as is described in more detail below.

The mounting element 16 further includes a second channel 30 which has its legs 31 projecting upwardly so that the channel 30 opens upwardly and towards the downwardly opening channel 20. The channels are fixed together by vertical rods 33 which are welded at their opposite ends to the channels 20 and 30. In order to provide additional means for holding and securing the mounting element 16 in the concrete floor, there is provided a horizontal channel 32 which extends at right angles to the direction of extension of the channels 20 and 30 and which overlies the lower channel 31. The channel 32 extends between the upper and lower channels and between the two vertical rods 33.

The mounting elements 16 are usable for mounting various force-transmitting elements to the floor of the body shop. As shown in FIGS. 3 and 4 an eyelet element 40 is secured to the mounting element 16 by means of bolts 41 which extend through three apertures in channel portion 42 of the force-transmitting element 40. The bolts 41 also extend into the threaded apertures 21 and 22 of the mounting element 16. The force-transmitting element 40 further includes a bale or loop 45 which defines the eyelet and which is welded to the channel 42.

Figure 6:
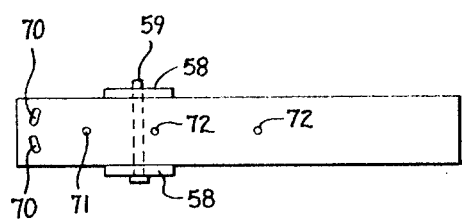
FIG. 6 is a bottom plan view of the structure illustrated in FIG. 5.

Referring to FIGS. 5 and 6, there is illustrated a further force-transmitting element 50 which incorporates a hydraulic cylinder 51 as a means for exerting force upon the automobile or other workpiece. The force-transmitting element 50 includes a lower horizontal channel 52 to which is pivotaly mounted a generally vertically extending post 55. The post 55 has four side walls 56 and a hollow center 57 and is pivotally secured to the horizontal channel 52 by plates 58 and a pin 59. The pivoting or swinging action of the post 55 is limited by two uprights 60 which are fixed at their lower ends to the channel 52. The hydraulic cylinder 51 is pivotally secured at one end 61 to the horizontal member 52 and has a piston 62 which is pivotally secured to the upright or generally vertical member 55.

An eyelet element 63 having a loop or bale 64 is also provided with a rectangular shaped portion 65 which is vertically movable upon the generally vertical member 55 in order to change the vertical position of the eyelet 63. The channel 52 is provided with five apertures 70, 71 and 72 which are usable in mounting the force-transmitting element 50 to a respective one of the mounting elements 16. Bolts can be inserted through the apertures 70 into the threaded apertures 22. A bolt is inserted through the aperture 71 into the threaded aperture 21 and two further bolts are inserted through apertures 72 into one of the three sets of apertures 23, 24 or 25. It can be appreciated that the provision of the slotted configuration of the apertures 70 as well as the three sets of apertures 23, 24 and 25 makes possible mounting the channel 52 at any of three different angles. This feature is particularly useful in positioning the force-transmitting element 50 at the proper angle in order to exert the force at the proper angle on the damaged automobile or other vehicle.

Figure 7:
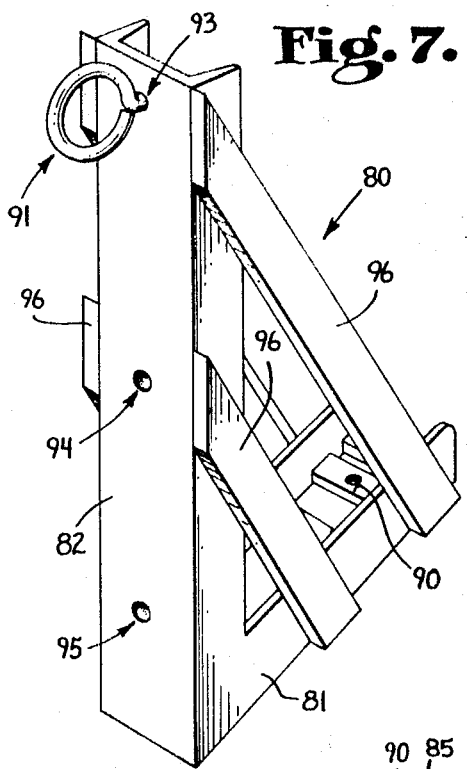
FIG. 7 is a perspective view of a further force-transmitting element forming a part of the present invention.
Figure 8:
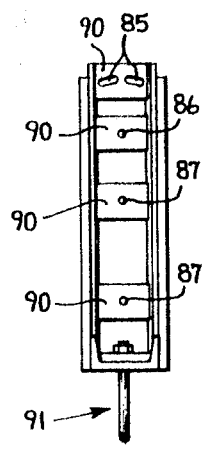
FIG. 8 is a bottom plan view of the structure illustrated in FIG. 7.

Referring to FIGS. 7 and 8, there is illustrated a further force-transmitting element 80 which includes a pair of channels 81 and 82 secured to one another in perpendicular relation so as to provide an L-shaped member with legs 81 and 82 of channel shaped cross section. The horizontal leg 81 of the force-transmitting member 80 has a plurality of apertures 85, 86 and 87 which are arranged in the same positions as the apertures 70, 71 and 72 of the force-transmitting member 50 and which are used in exactly the same manner as the apertures 70, 71 and 72 to mount the force-transmitting member 80 selectively in any of three positions on a respective one of the mounting elements 16. The apertures 85, 86 and 87 are reinforced by backup blocks 90 (as are the apertures 70, 71 and 72) in the same manner as the threaded apertures in the channel 20. An eyelet 91 is selectively secured to the upright leg 82 at any of three locations 93, 94 and 95 by a nut or the like. The force-transmitting element 80 is reinforced by diagonal braces 96 which are fixed at opposite ends to the two legs 81 and 82.

It will be evident from the above description that the present invention provides improved body shop apparatus which is relatively small in size and easily handled, yet which can be used for heavy body shop work such as, for example, the exertion of force on the frame of an automobile simultaneously at opposite ends thereof. It will also be evident from the above description that the present invention provides body shop apparatus which can be adjusted to provide forces on an automobile or the like at many different angles and in many different directions. Thus, if a force is to be exerted upon the automobile at a low down position, the eyelet 63 can be adjusted downwardly as can the eyelet 91 to either the aperture 94 or the aperture 95 of FIG. 7. It should also be mentioned that two of the force-transmitting elements 80 can be used in place of one of the force-transmitting elements 50 and one of the force-transmitting elements 80. This is accomplished by the use of a commercially available power means which replaces the hydraulic cylinder 51 of FIG. 5. Such commercially available power means might be those noted by the trademark "Porta Power" or "Come Along."

While the invention has been illustrated and described in detail in the drawings and foregoing description, the same is to be considered as illustrative and not restrictive in character, it being understood that only the preferred embodiment has been shown and described and that all changes and modifications that come within the spirt of the invention and the scope of the claims are also desired to be protected.

The invention claimed is:

1. Body shop apparatus comprising a concrete floor, a plurality of mounting elements sunk in said concrete floor with the upper surface of said mounting elements flush with the upper surface of said concrete floor, a plurality of force-transmitting elements each removably fixed to a respective one of said mounting elements and adapted to engage a vehicle for exerting force on the vehicle, said concrete floor being flat contiguous and adjacent to said mounting elements and said mounting elements having flat upper surfaces which are continuations of the flat surfaces of said floor whereby various vehicles can be moved over the concrete floor and over the mounting elements without movement of the vehicles being interfered with, each of said mounting elements comprise an upper channel; a lower channel; said upper channel and said lower channel opening toward one another; a pair of rods connecting said upper channel and said lower channel; a horizontal channel extending between said rods and said upper and lower channel and overlying said lower channel; said upper channel having an upper face which is flush with said concrete floor; said upper channel having threaded apertures extending therethrough for receiving bolts to secure said force-transmitting members to said mounting elements said threaded apertures opening at the upper surface of said mounting elements; said lower channel, rods and horizontal channel being embedded inside of said concrete floor.

2. Body shop apparatus comprising a concrete floor, a plurality of mounting elements sunk in said concrete floor with the upper surface of said mounting elements flush with the upper surface of said concrete floor, a plurality of force-transmitting elements each removably fixed to a respective one of said mounting elements and adapted to engage a vehicle for exerting force on the vehicle, at least one of said force-transmitting elements comprising an L-shaped member including a pair of legs of channel-shaped cross section, diagonal braces extending from one leg to the other leg of said L-shaped member, one of said legs extending horizontally and having a plurality of apertures therethrough, said mounting elements each having a plurality of threaded apertures therein, bolts extending through said one leg's apertures and threaded into one of said mounting elements and securing said one force-transmitting element to said one mounting element, the other of said legs extending vertically, and an eyelet removably secured to said other leg and securable to said other leg at one of a plurality of vertically spaced points, said horizontal leg's plurality of apertures being three in number and being in alignment; said mounting element having seven threaded apertures therein; one of said seven being in alignment with a first pair, a second pair and a third pair of said seven apertures; said one force-transmitting element being selectively securable by said bolts in any of three positions in a first of which said bolts extend through said three horizontal leg apertures and into said first pair of threaded apertures and one threaded aperture, in a second of which said bolts extend through said three horizontal leg apertures and into said second pair of threaded apertures and one threaded aperture, and in a third of which said bolts extend through said three horizontal leg apertures and into said third pair of threaded apertures and one threaded aperture.

References Cited

UNITED STATES PATENTS

| | | | |
|---|---|---|---|
| 2,421,981 | 6/1947 | Becker | 72—457 |
| 2,836,219 | 5/1958 | Pertner | 72—705 X |
| 2,979,102 | 4/1961 | Ferguson et al. | 72—705 X |
| 3,088,513 | 5/1963 | Marquardt | 72—457 X |
| 3,187,538 | 6/1965 | Painter | 72—705 X |
| 3,206,966 | 9/1965 | Fagan et al. | 72—705 X |
| 3,269,169 | 8/1966 | Latuff et al. | 72—705 X |
| 1,948,093 | 2/1934 | Baird et al. | 52—707 |

CHARLES W. LANHAM, Primary Examiner

E. SUTTON, Assistant Examiner

U.S. Cl. X.R.

52—707; 72—457, 705